Patented Dec. 21, 1943

2,337,466

UNITED STATES PATENT OFFICE 2,337,466

SPRAY OIL

Frank B. Herbert, Piedmont, Calif., assignor to Shell Development Company, San Francisco, Calif., a corporation of Delaware No Drawing. Application November 29, 1940, Serial No. 367,834

19 Claims. (Cl. 167—16)

The use of copper salts as fungicides is well known. However, the use of water sprays which contain a water soluble or suspendible copper compound such as Bordeaux mixture has been found ineffective in many instances since it is difficult or impossible to secure an adequate deposit of copper by this method, a large portion of the copper running off the plant with the drips.

It has also been proposed to use oil soluble copper salts or soaps such as copper naphthenate and copper resinate in mineral oil emulsions. Such emulsions have the advantage of being both fungicides and insecticides, but since the effective copper compounds are, in general, only sparingly soluble in hydrocarbon oils, the emulsions suffer from the defect of neither containing nor depositing sufficient copper to have the desired effectiveness.

It is the object of the present invention to provide a spray which has a strong fungicidal as well as some insecticidal action and which can be applied to many plants and trees without injury.

It has been found that by using an emulsion of oil-in-water the oil of which contains an oil soluble copper compound and the water of which contains a dissolved or suspended copper compound, copper can be deposited on the plant in amounts and concentrations greatly exceeding those heretofore obtainable and greater than could be expected from the sum of the known fungicidal effects. The mechanism responsible for the improved result is believed to be that a portion of the copper compound from the water will be attracted by the copper of the oil to the oil-water interface. On spraying, the emulsion will break depositing the oil on the plant, and as a result of the attraction between the copper of the oil and that of the water, the oil will contain not only the oil soluble copper but a portion of the copper from the water as well. Much of the copper in the water would ordinarily be lost in the drips of an ordinary spray such as Bordeaux mixture with oil. Thus sprays with copper in both the oil and water phases cause the deposition of much more copper than would be expected from the additive effect of sprays containing copper in one phase only. Further, it has been found that at least a portion of the oil soluble copper compound is actually absorbed and retained in the tissues of the plant while adsorbed copper remains tightly attached to the surface so that the plant has a double acting protection from later fungus infections. Thus such sprays possess a pronounced advantage over the usual fungicides such as Bordeaux mixture which are soon washed off the plant by rain, or copper naphthenate sprays which fail to give lasting protection by reason of insufficient amounts of available copper.

An emulsifying agent is preferably used with the oil to keep the oil suspended in water before it is sprayed. This may be any known emulsifying agent such as are well known to those skilled in the art, such as petroleum sulfonates; vegetable, animal and fish oils which may or may not be sulfated, sulfonated, polymerized or blown; soaps, e. g., whale oil and other fatty acid soaps or sulfonic acid soaps; alkyl sulfates; amine salts of fatty and sulfo acids; fatty acid esters and the like, but is preferably an oil soluble emulsifying agent such as a hydroxy ester of a carboxylic acid, e. g., glycerol mono-oleate, which does not give a very tight emulsion. One emulsifying agent which was found to be particularly effective and which is hereafter designated as MA was made by mixing a hydroxy ester combining a polyethylene glycol with a fatty acid, and a sulfonated bicarboxylic acid having about 12 carbon atoms.

Mutual solvents for the oil and oil-soluble copper compound such as pine oil, turpineol; alcohols such as n-propyl or isopropyl alcohol, tertiary butyl alcohol; ketones such as acetone, methyl ethyl ketone, cyclohexyl ketone; ethers such as dioxan, di-isopropyl ether, tertiary butyl ether; chlorinated hydrocarbons and nitrogen base compounds such as pyridine, quinoline, morpholine, propyl amine, butyl amine, amyl-amine, hexyl amines including cyclohexyl amine, pentanol amines, amino diethyl ether, petroleum nitrogen bases and the like may be used to increase the solubility of the copper compound in the oil.

The oil soluble copper compound should be used in concentrations approaching its solubility limit in the mineral or other oil. Copper resinate and copper naphthenate are the preferred oil soluble copper compounds because of their low cost and effective action, but other oil soluble copper compounds such as copper oleate, copper salts of organic sulfates and sulfonates, copper salts of alklated aromatic acids, alkyl thiophenols, alkyl benzoic or salacylic acid and copper amides, particularly amides having long alkyl radicals, can be used as well.

In the present invention the use of spreaders or water conditioners with the spray in order to prevent complete inversion of the spray mixture when the water soluble copper compound is added is highly desirable. The spreader effects a balance between the tendency of the emulsifying agent to make a tight emulsion and the tendency of the water soluble or suspendible copper compound (which is, of course, an electrolyte) to break and/or invert the oil-in-water emulsion. The spreaders which are preferred are protein materials such as blood albumin or casein. When blood albumin is used it has been found to be desirable to also use a clay such as fuller's earth to help disperse the blood albumin in the spray mixture. Other spreading agents can be used to advantage such as alkyl sulfates, alkyl sulfonates and sulfonated aromatic compounds. Preferably such compounds should have at least 8 carbon atoms and may be used as such or in the form of their sodium salts. Examples of such compounds which have been found suitable include oleyl acid sulfate and its sodium salt, dioleyl sulfate, sodium oleyl sulfonate and sulfonated ethyl diphenyl. These sulfated and sulfonated compounds act as emulsifying agents, and by their use the amount of other emulsifying agent as previously given can be reduced or even eliminated.

The preferred water phase copper compound is basic copper sulfate, $(CuSO_4.3CuO_2)$. Other copper compounds such as Bordeaux mixture $(CuSO_4+CaO)$, Burgundy mixture $$(CuSO_4+Na_2CO_3)$$

can be used as well. The copper compound used in the water phase may be the same as that used in the oil phase, or may be another oil-soluble copper compound. These oil-soluble copper compounds may be suspended in water along with the oil containing dissolved copper compounds. Other water soluble or dispersible copper compounds such as copper cyanate, cupric nitrate, copper ammonia, cuprous oxide, copper ammonium silicate, copper ammonium carbonate, basic copper chloride, copper phosphate, copper acetate and cuprous cyanide may be used. Many of the copper compounds, particularly those which are water soluble, are phytocidal, so that extreme care must be exercised in their use. Further, those compounds which form solutions have less of a tendency to go to the oil-water interface on the inversion of the emulsion and therefore are less useful in securing a high deposit of copper than the compounds such as basic copper sulfate which merely form suspensions in water. Sprays containing strongly phytocidal copper compounds may be used for disinfecting seeds and the like, and their safety can be increased in many instances by the addition of a relatively mild alkali such as sodium carbonate, lime or ammonia, so that they may be used on plants.

In use, the emulsifying agent and a light spray mineral oil are combined along with an oil soluble copper compound and pine oil, if desired. The oil is then mixed with water to form an emulsion, from .1 to 5% or preferably about 2% of oil being used. The maximum possible amount of the oil soluble copper compound is preferably dissolved in the oil and to secure satisfactory results, at least 2% of the compound is dissolved. The use of pine oil or other mutual solvent will enable larger quantities of the copper compound to be dissolved. To this emulsion is added the protein spreader and a water suspendible copper compound. Ordinarily the mixture so produced should be sprayed within an hour after the copper is added to the water, or inversion of the emulsion in the spray tank is likely to result.

The amount of the basic copper sulfate or other water phase copper compound may be from between ¼ to 8 pounds per 100 gallons of emulsion, and is preferably about 2 lbs. The protein spreading material may be used in quantities of from .1 to 16 ounces per 100 gallons and preferably from .5 to 3 ounces. If a colloidal clay is used its quantity should be about three times that of the protein spreading agent.

The above quantities are necessarily only estimates since variations in the impurities of the water used, the nature of the spray oil and emulsifier, and climatic conditions all will affect the tendency of the emulsion to invert. Therefore, slight changes from the suggested compositions may be necessary to compensate for the various factors, it being understood that the spray mixture should be adjusted so that it is at the point of incipient inversion.

To show the beneficial results which are obtained by the use of the present invention the following tests were performed. To a spray oil containing 85.15% of heavy mineral spray oil (California State Department Agriculture classification), 10% of fungicidal oil, 1% pine oil and .85% MA emulsifier was added to 98% of water to make a spray oil emulsion. The fungicidal oil used had a copper naphthenate content of 33% by weight and contained 3.2% by weight of metallic copper. To this emulsion were added varying amounts of a spreading agent and basic copper sulfate as listed below. The emulsion was sprayed at 500 lbs. per square inch pressure on beeswax coated plates and the total deposit, oil soluble copper deposit, and water soluble copper deposit were measured. Beeswax coated plates were used since they closely simulate the leaves and fruit of plants. In tests, 5, 6, 7 and 8, the amount of oil in the oil phase was increased to 88.58% and the amount of MA emulsifying agent was reduced to .42%.

|  | Test No. | | | | | | | |
|---|---|---|---|---|---|---|---|---|
|  | 1 | 2 | 3 | 4 | 5 | 6 | 7 | 8 |
| Basic copper sulfate (lb. per 100 gal.) | | 2 | 2 | 2 | 2 | 2 | 2 | 2. |
| Spreaders (oz. per 100 gal.): | | | | | | | | |
| Blood albumin | | | .5 | 1 | | .5 | 1 | |
| Fuller's earth | | | 1.5 | 3 | | 1.5 | 3 | |
| Casein | | | | | | | | 8. |
| Scumming in spray tank | Slight | Extreme | Moderate | Slight | Extreme | Very slight | None | Slight. |
| Inversion in spray tank | None | do | do | Moderate | Extreme flocculation | Slight | Very slight | Very slight. |
| Total deposit (in mgs./cm.²) | 85 | 507 | 327 | 260 | 730 | 165 | 130 | 205. |
| Organic copper (as metal) | 1.6 | 3.4 | 1.6 | 1.6 | .445 | 1.8 | 1.8 | 2.2. |
| Inorganic copper (as metal) | | 84.0 | 51.4 | 46.0 | 155 | 7.8 | 3.4 | 8.2. |
| Total copper deposit | 1.6 | 87.4 | 53.0 | 47.6 | 155.445 | 9.6 | 5.2 | 10.4. |

From the above it can readily be seen that the spreading agent is desirable in that it prevents inversion of the emulsion in the tank. When inversion occurs it is difficult or impossible to spray the emulsion with the normally used equipment.

The oil which is used in the present invention is preferably a hydrocarbon oil of the refined type which are well known for use in spray oil emulsions. In general, such oils have a Saybolt Universal viscosity of from about 50 to 150 at 100° F. and an unsulfonatable residue of from about 70 to 95. Vegetable, animal or fish oils may be substituted in whole or in part for the hydrocarbon oil without departing from the spirit of the present invention.

In the claims the term "dispersed" is understood to mean both dissolved or suspended.

I claim as my invention:

1. An insecticide and fungicide comprising a sprayable oil-in-water emulsion containing an oil soluble copper compound in the oil phase of said emulsion and a copper compound dispersed in the water phase of said emulsion.

2. An insecticide and fungicide comprising a sprayable oil-in-water emulsion containing an emulsifying agent, the oil phase of said emulsion containing an oil soluble copper compound dissolved therein and the water phase of said emulsion containing a copper compound dispersed therein.

3. The composition of claim 2 in which the oil soluble copper compound is a compound chosen from the group consisting of copper naphthenate and copper resinate.

4. An insecticide and fungicide comprising a sprayable oil-in-water emulsion containing an emulsifying agent and a spreading agent, the oil phase of said emulsion containing an oil soluble copper compound dissolved therein and the water phase of said emulsion containing a copper compound dispersed therein.

5. The composition of claim 4 in which the spreading agent is a member chosen from the group consisting of casein and blood albumin.

6. An insecticide and fungicide comprising a sprayable oil-in-water emulsion containing an emulsifying agent, the oil phase of said emulsion containing a dissolved oil soluble copper compound and the water phase of said emulsion containing a copper compound dispersed therein, said dispersed copper compound comprising basic copper sulfate as its major constituent.

7. The composition of claim 6 in which the copper compound dispersed in the water phase contains cuprous oxide.

8. The composition of claim 6 in which the copper compound dispersed in the water phase contains lime.

9. The composition of claim 6 in which the copper compound dispersed in the water phase contains sodium carbonate.

10. An insecticide and fungicide comprising a sprayable oil-in-water emulsion containing an emulsifying agent the oil phase of said emulsion containing an oil soluble copper compound and a mutual solvent for said oil and copper compound dissolved therein, and the water phase of said emulsion containing a copper compound dispersed therein.

11. The composition of claim 10 wherein the mutual solvent is pine oil.

12. An insecticide and fungicide comprising a sprayable oil-in-water emulsion containing an emulsifying agent, the oil phase of said emulsion containing an oil soluble copper compound dissolved therein and the water phase containing a small amount of the said oil soluble copper compound suspended therein.

13. An insecticide and fungicide comprising a sprayable oil-in-water emulsion containing an oil soluble copper compound in the oil phase and a copper compound dispersed in the water phase of said emulsion, said emulsion containing an emulsifying agent and a protein spreading agent.

14. The composition of claim 13 in which the spreading agent is blood albumin.

15. The composition of claim 13 in which the spreading agent is casein.

16. A sprayable oil-in-water emulsion containing from about .1 to 5% of oil and comprising a plant spray mineral oil containing about 3.3% of an oil soluble copper compound dissolved therein, and water containing a copper compound dispersed therein, the amount of said copper compound in the water being about ¼ to 8 pounds per 100 gallons of emulsion to which emulsion has been added from about 0.1 to 16 ounces of a protein spreading material per 100 gallons of emulsion.

17. The emulsion of claim 16 in which the amount of oil is about 2%, in which the amount of oil-soluble copper compound in the oil is at least 2%, in which the dispersed copper compound is present to the extent of about 2 pounds per 100 gallons of emulsion and the amount of the protein spreading material is about .5 to 3 ounces per 100 gallons of emulsion.

18. An oil-in-water emulsion harmless to living vegetation when sprayed thereon comprising an oil phase containing a plant spray mineral oil and a small amount of a copper compound chosen from the group consisting of copper naphthenate and copper resinate and a water phase having dispersed therein a copper sulfate compound chosen from the group consisting of basic copper sulfate, Bordeaux mixture and Burgundy mixture, the emulsion containing a protein spreading material in amount just sufficient to prevent inversion of the spray emulsion.

19. The method of producing a fungicidal spray oil emulsion comprising adding to an emulsion of plant spray mineral oil in water, the oil of which contains a dissolved copper compound, a small amount of a water dispersible copper compound which would normally cause said emulsion to invert and an amount of a protein spreading material just sufficient to prevent the inversion of said emulsion.

FRANK B. HERBERT.